(12) United States Patent
Drimbarean et al.

(10) Patent No.: US 8,199,222 B2
(45) Date of Patent: Jun. 12, 2012

(54) LOW-LIGHT VIDEO FRAME ENHANCEMENT

(75) Inventors: Alexandru Drimbarean, Galway (IE); Adrian Zamfir, Bucharest (RO); Felix Albu, Bucharest (RO); Vlad Poenaru, Bucharest (RO); Corneliu Florea, Bucharest (RO); Petronel Bigioi, Galway (IE); Eran Steinberg, San Francisco, CA (US); Peter Corcoran, Claregalway (IE)

(73) Assignee: DigitalOptics Corporation Europe Limited, Galway (IE)

( * ) Notice: Subject to any disclaimer, the term of this patent is extended or adjusted under 35 U.S.C. 154(b) by 315 days.

(21) Appl. No.: 12/485,316

(22) Filed: Jun. 16, 2009

(65) Prior Publication Data

US 2009/0303343 A1 Dec. 10, 2009

Related U.S. Application Data

(63) Continuation-in-part of application No. 12/330,719, filed on Dec. 9, 2008, which is a continuation-in-part of application No. 11/856,721, filed on Sep. 18, 2007.

(60) Provisional application No. 60/893,116, filed on Mar. 5, 2007.

(51) Int. Cl.
*H04N 5/225* (2006.01)
(52) U.S. Cl. .................................................. 348/239
(58) Field of Classification Search ............... 348/218.1, 348/222.1, 239, 252, 262
See application file for complete search history.

(56) References Cited

U.S. PATENT DOCUMENTS

| | | | |
|---|---|---|---|
| 5,251,019 A | 10/1993 | Moorman et al. |
| 5,374,956 A | 12/1994 | D'Luna |
| 5,392,088 A | 2/1995 | Abe et al. |
| 5,428,723 A | 6/1995 | Ainscow et al. |
| 5,510,215 A | 4/1996 | Prince et al. |
| 5,599,766 A | 2/1997 | Boroson et al. |
| 5,686,383 A | 11/1997 | Long et al. |
| 5,747,199 A | 5/1998 | Roberts et al. |
| 5,751,836 A | 5/1998 | Wildes et al. |

(Continued)

FOREIGN PATENT DOCUMENTS

DE 3729324 A1 3/1989

(Continued)

OTHER PUBLICATIONS

Notice of Allowance mailed Apr. 29, 2010, for U.S. Appl. No. 11/690,836, filed Mar. 25, 2007.

(Continued)

*Primary Examiner* — Jason Whipkey
(74) *Attorney, Agent, or Firm* — Andrew V. Smith

(57) ABSTRACT

A method of combining image data from multiple frames to enhance one or more parameters of video image quality includes acquiring a first image at a first exposure duration, as well as acquiring a second image at a second exposure duration shorter than the first exposure duration and at a time just before, just after or overlapping in time with acquiring the first image, such that the first and second images include approximately a same first scene. In this way, the second image is relatively sharp and under-exposed, while the first image is relatively well-exposed and less sharp than the second image. Brightness and/or color information are extracted from the first image and applied to the second image to generate an enhanced version of the second image.

42 Claims, 5 Drawing Sheets

U.S. PATENT DOCUMENTS

| | | |
|---|---|---|
| 5,756,239 A | 5/1998 | Wake |
| 5,756,240 A | 5/1998 | Roberts et al. |
| 5,802,220 A | 9/1998 | Black et al. |
| 5,889,277 A | 3/1999 | Hawkins et al. |
| 5,889,554 A | 3/1999 | Mutze |
| 5,909,242 A | 6/1999 | Kobayashi et al. |
| 5,981,112 A | 11/1999 | Roberts |
| 6,028,960 A | 2/2000 | Graf et al. |
| 6,035,072 A | 3/2000 | Read |
| 6,041,078 A | 3/2000 | Rao |
| 6,061,462 A | 5/2000 | Tostevin et al. |
| 6,081,606 A | 6/2000 | Hansen et al. |
| 6,114,075 A | 9/2000 | Long et al. |
| 6,122,017 A | 9/2000 | Taubman |
| 6,124,864 A | 9/2000 | Madden et al. |
| 6,134,339 A | 10/2000 | Luo |
| 6,269,175 B1 | 7/2001 | Hanna et al. |
| 6,297,071 B1 | 10/2001 | Wake |
| 6,297,846 B1 | 10/2001 | Edanami |
| 6,326,108 B2 | 12/2001 | Simons |
| 6,330,029 B1 | 12/2001 | Hamilton et al. |
| 6,360,003 B1 | 3/2002 | Doi et al. |
| 6,365,304 B2 | 4/2002 | Simons |
| 6,381,279 B1 | 4/2002 | Taubman |
| 6,387,577 B2 | 5/2002 | Simons |
| 6,407,777 B1 | 6/2002 | DeLuca |
| 6,535,244 B1 | 3/2003 | Lee et al. |
| 6,555,278 B1 | 4/2003 | Loveridge et al. |
| 6,567,536 B2 | 5/2003 | McNitt et al. |
| 6,599,668 B2 | 7/2003 | Chari et al. |
| 6,602,656 B1 | 8/2003 | Shore et al. |
| 6,607,873 B2 | 8/2003 | Chari et al. |
| 6,618,491 B1 | 9/2003 | Abe |
| 6,625,396 B2 | 9/2003 | Sato |
| 6,643,387 B1 | 11/2003 | Sethuraman et al. |
| 6,863,368 B2 | 3/2005 | Sadasivan et al. |
| 6,892,029 B2 | 5/2005 | Tsuchida et al. |
| 6,947,609 B2 | 9/2005 | Seeger et al. |
| 6,961,518 B2 | 11/2005 | Suzuki |
| 7,019,331 B2 | 3/2006 | Winters et al. |
| 7,072,525 B1 | 7/2006 | Covell |
| 7,084,037 B2 | 8/2006 | Gamo et al. |
| 7,160,573 B2 | 1/2007 | Sadasivan et al. |
| 7,180,238 B2 | 2/2007 | Winters |
| 7,195,848 B2 | 3/2007 | Roberts |
| 7,269,292 B2 | 9/2007 | Steinberg |
| 7,315,630 B2 | 1/2008 | Steinberg et al. |
| 7,315,631 B1 | 1/2008 | Corcoran et al. |
| 7,316,630 B2 | 1/2008 | Tsukada et al. |
| 7,316,631 B2 | 1/2008 | Tsunekawa |
| 7,317,815 B2 | 1/2008 | Steinberg et al. |
| 7,336,821 B2 | 2/2008 | Ciuc et al. |
| 7,369,712 B2 | 5/2008 | Steinberg et al. |
| 7,403,643 B2 | 7/2008 | Ianculescu et al. |
| 7,453,510 B2 | 11/2008 | Kolehmainen et al. |
| 7,460,695 B2 | 12/2008 | Steinberg et al. |
| 7,469,071 B2 | 12/2008 | Drimbarean et al. |
| 7,551,755 B1 | 6/2009 | Steinberg et al. |
| 7,565,030 B2 | 7/2009 | Steinberg et al. |
| 7,657,172 B2 * | 2/2010 | Nomura et al. ............ 348/222.1 |
| 2001/0036307 A1 | 11/2001 | Hanna et al. |
| 2002/0006163 A1 | 1/2002 | Hibi et al. |
| 2003/0052991 A1 | 3/2003 | Stavely et al. |
| 2003/0058361 A1 | 3/2003 | Yang |
| 2003/0091225 A1 | 5/2003 | Chen |
| 2003/0103076 A1 | 6/2003 | Neuman |
| 2003/0151674 A1 | 8/2003 | Lin |
| 2003/0152271 A1 | 8/2003 | Tsujino et al. |
| 2003/0169818 A1 | 9/2003 | Obrador |
| 2003/0193699 A1 | 10/2003 | Tay |
| 2003/0219172 A1 | 11/2003 | Caviedes et al. |
| 2004/0066981 A1 | 4/2004 | Li et al. |
| 2004/0076335 A1 | 4/2004 | Kim |
| 2004/0090532 A1 | 5/2004 | Imada |
| 2004/0120598 A1 | 6/2004 | Feng |
| 2004/0120698 A1 | 6/2004 | Hunter |
| 2004/0130628 A1 | 7/2004 | Stavely |
| 2004/0169767 A1 | 9/2004 | Norita et al. |
| 2004/0212699 A1 | 10/2004 | Molgaard |
| 2004/0218057 A1 | 11/2004 | Yost et al. |
| 2004/0218067 A1 | 11/2004 | Chen et al. |
| 2004/0247179 A1 | 12/2004 | Miwa et al. |
| 2005/0010108 A1 | 1/2005 | Rahn et al. |
| 2005/0019000 A1 | 1/2005 | Lim et al. |
| 2005/0031224 A1 | 2/2005 | Prilutsky et al. |
| 2005/0041121 A1 | 2/2005 | Steinberg et al. |
| 2005/0041123 A1 | 2/2005 | Ansari et al. |
| 2005/0047672 A1 | 3/2005 | Ben-Ezra et al. |
| 2005/0052553 A1 | 3/2005 | Kido et al. |
| 2005/0057687 A1 | 3/2005 | Irani et al. |
| 2005/0068446 A1 | 3/2005 | Steinberg et al. |
| 2005/0068452 A1 | 3/2005 | Steinberg et al. |
| 2005/0140801 A1 | 6/2005 | Prilutsky et al. |
| 2005/0140829 A1 | 6/2005 | Uchida et al. |
| 2005/0201637 A1 | 9/2005 | Schuler et al. |
| 2005/0219391 A1 | 10/2005 | Sun et al. |
| 2005/0231625 A1 | 10/2005 | Parulski et al. |
| 2005/0259864 A1 | 11/2005 | Dickinson et al. |
| 2005/0270381 A1 | 12/2005 | Owens et al. |
| 2005/0281477 A1 | 12/2005 | Shiraki et al. |
| 2006/0006309 A1 | 1/2006 | Dimsdale et al. |
| 2006/0017837 A1 * | 1/2006 | Sorek et al. ................... 348/362 |
| 2006/0038891 A1 | 2/2006 | Okutomi et al. |
| 2006/0039690 A1 | 2/2006 | Steinberg et al. |
| 2006/0093212 A1 | 5/2006 | Steinberg et al. |
| 2006/0098237 A1 | 5/2006 | Steinberg et al. |
| 2006/0098890 A1 | 5/2006 | Steinberg et al. |
| 2006/0098891 A1 | 5/2006 | Steinberg et al. |
| 2006/0119710 A1 | 6/2006 | Ben-Ezra et al. |
| 2006/0120599 A1 | 6/2006 | Steinberg et al. |
| 2006/0125938 A1 | 6/2006 | Ben-Ezra et al. |
| 2006/0133688 A1 | 6/2006 | Kang et al. |
| 2006/0140455 A1 | 6/2006 | Costache et al. |
| 2006/0170786 A1 | 8/2006 | Won |
| 2006/0171464 A1 | 8/2006 | Ha |
| 2006/0187308 A1 | 8/2006 | Lim et al. |
| 2006/0204034 A1 | 9/2006 | Steinberg et al. |
| 2006/0204054 A1 | 9/2006 | Steinberg et al. |
| 2006/0204110 A1 | 9/2006 | Steinberg et al. |
| 2006/0285754 A1 | 12/2006 | Steinberg et al. |
| 2007/0025714 A1 | 2/2007 | Shiraki |
| 2007/0058073 A1 | 3/2007 | Steinberg et al. |
| 2007/0086675 A1 | 4/2007 | Chinen et al. |
| 2007/0097221 A1 | 5/2007 | Stavely et al. |
| 2007/0110305 A1 | 5/2007 | Corcoran et al. |
| 2007/0147820 A1 | 6/2007 | Steinberg et al. |
| 2007/0189748 A1 | 8/2007 | Drimbarean et al. |
| 2007/0201724 A1 | 8/2007 | Steinberg et al. |
| 2007/0234779 A1 | 10/2007 | Hsu et al. |
| 2007/0269108 A1 | 11/2007 | Steinberg et al. |
| 2007/0296833 A1 | 12/2007 | Corcoran et al. |
| 2008/0012969 A1 | 1/2008 | Kasai et al. |
| 2008/0037827 A1 | 2/2008 | Corcoran et al. |
| 2008/0037839 A1 | 2/2008 | Corcoran et al. |
| 2008/0037840 A1 | 2/2008 | Steinberg et al. |
| 2008/0043121 A1 | 2/2008 | Prilutsky et al. |
| 2008/0166115 A1 * | 7/2008 | Sachs et al. ..................... 396/55 |
| 2008/0175481 A1 | 7/2008 | Petrescu et al. |
| 2008/0211943 A1 | 9/2008 | Egawa et al. |
| 2008/0218611 A1 * | 9/2008 | Parulski et al. ............... 348/262 |
| 2008/0219581 A1 * | 9/2008 | Albu et al. .................... 382/261 |
| 2008/0219585 A1 | 9/2008 | Kasai et al. |
| 2008/0220750 A1 | 9/2008 | Steinberg et al. |
| 2008/0231713 A1 | 9/2008 | Florea et al. |
| 2008/0232711 A1 | 9/2008 | Prilutsky et al. |
| 2008/0240555 A1 | 10/2008 | Nanu et al. |
| 2008/0259175 A1 * | 10/2008 | Muramatsu et al. ........ 348/222.1 |
| 2008/0267530 A1 * | 10/2008 | Lim ............................. 382/284 |
| 2008/0292193 A1 | 11/2008 | Bigioi et al. |
| 2008/0309769 A1 | 12/2008 | Albu et al. |
| 2008/0309770 A1 | 12/2008 | Florea et al. |
| 2009/0003652 A1 | 1/2009 | Steinberg et al. |
| 2009/0009612 A1 | 1/2009 | Tico et al. |
| 2009/0080713 A1 | 3/2009 | Bigioi et al. |
| 2009/0080796 A1 | 3/2009 | Capata et al. |
| 2009/0080797 A1 | 3/2009 | Nanu et al. |
| 2009/0179999 A1 * | 7/2009 | Albu et al. .................. 348/222.1 |

| | | | |
|---|---|---|---|
| 2009/0185041 | A1 | 7/2009 | Kang et al. |
| 2009/0185753 | A1 | 7/2009 | Albu et al. |
| 2009/0190803 | A1 | 7/2009 | Neghina et al. |
| 2009/0196466 | A1 | 8/2009 | Capata et al. |
| 2009/0284610 | A1* | 11/2009 | Fukumoto et al. ........ 348/208.99 |
| 2010/0026823 | A1* | 2/2010 | Sawada ...................... 348/222.1 |

FOREIGN PATENT DOCUMENTS

| | | |
|---|---|---|
| DE | 10154203 A1 | 6/2002 |
| DE | 10107804 A1 | 9/2002 |
| EP | 0944251 A1 | 9/1999 |
| EP | 944251 B1 | 4/2003 |
| EP | 1583033 A2 | 10/2005 |
| EP | 1779322 B1 | 1/2008 |
| EP | 1429290 B1 | 7/2008 |
| JP | 10285542 A2 | 10/1998 |
| JP | 11327024 A2 | 11/1999 |
| WO | WO-9843436 A1 | 10/1998 |
| WO | WO 01/13171 A1 | 2/2001 |
| WO | WO-0245003 A1 | 6/2002 |
| WO | WO 03071484 A1 | 8/2003 |
| WO | WO-04001667 A2 | 12/2003 |
| WO | WO-2004036378 A2 | 4/2004 |
| WO | WO-2006050782 A1 | 5/2006 |
| WO | WO-2007093199 A2 | 8/2007 |
| WO | WO-2007093199 A3 | 8/2007 |
| WO | WO-2007142621 A1 | 12/2007 |
| WO | WO-2007143415 A2 | 12/2007 |
| WO | WO-2008017343 A1 | 2/2008 |
| WO | WO-2008131438 A2 | 10/2008 |
| WO | WO-2009036793 A1 | 3/2009 |
| WO | WO 2010/066381 A1 | 6/2010 |

OTHER PUBLICATIONS

PCT Notification of Transmittal of the International Search Report and the Written Opinion of the International Searching Authority, or the Declaration for PCT application No. PCT/EP2009/008674, dated Mar. 29, 2010, 10 pages.

Final Office Action mailed May 27, 2010, for U.S. Appl. No. 11/753,098, filed May 24, 2007.

Andrews, H.C. et al., "Digital Image Restoration", Prentice Hall, 1977.

Barabara Zitova et al., "Image registration methods: a survey," Image and Vision Computing 2003, pp. 977-1000, vol. 21.

Bates et al., "Some Implications of Zero Sheets for Blind Deconvolution and Phase Retrieval", J. Optical Soc. Am. A, 1990, pp. 468-479, vol. 7.

Ben Ezra, Moshe et al., "Motion Deblurring Using Hybrid Imaging", Proceedings IEEE Computer Society Conference on Computer Vision and Pattern Recognition, 2003.

Ben-Ezra, M. et al., "Motion-Based Motion Deblurring", IEEE Transactions on Pattern Analysis and Machine Intelligence, 2004, pp. 689-698, vol. 26—Issue 6.

Bennett, Eric P. et al., "Video Enhancement Using Per-Pixel Virtual Exposures", International Conference on Computer Graphics and Interactive Techniques, ACM Siggraph, 2005, pp. 845-852.

Bhaskaran, V. et al., "Motion estimation using a computation-constrained criterion", Digital Signal Processing Proceedings, 1997, pp. 229-232, vol. 1.

Bones at al., "Deconvolution and Phase Retrieval With Use of Zero Sheets", J. Optical. Soc. Am. A, 1995, pp. 1,842-1,857, vol. 12.

Cannon M., "Blind Deconvolution of Spatially Invariant Image Blurs with Phase," IEEE Transactions on Acoustics, Speech, and Signal Processing, 1976, vol. ASSP-24, No. 1.

Chen-Kuei Y. et al., "Color image sharpening by moment-preserving technique", Signal Processing, 1995, pp. 397-403, vol. 45—Issue 3, Elsevier Science Publishers.

Crowley, J. et al., "Multi-modal tracking of faces for video communication, http://citeseer.ist.psu.edu/crowley97multimodal.html", In Computer Vision and Patent Recognition, 1997.

Deever, A., "In-camera all-digital video stabilization", Proceedings of the International Conference on Decision Support Systems.Proceedings of ISDSS, 2006, pp. 190-193.

Demir. B. at al., "Block motion estimation using adaptive modified two-bit transform", 2007, pp. 215-222, vol. 1—Isuue 2.

Dufournaud et al., "Matching Images With Different Resolutions", IEEE Conference Proceedings on Computer Vision and Pattern Recognition, 2000.

Elad et al., "Restoration of a Single Superresolution Image from several Blurred, Noisy and Undersampled Measured Images", IEEE Trans. on Image Proc., 1997, vol. 6—Iss. 12.

Elad, Michael et al., "Superresolution Restoration of an Image Sequence: Adaptive Filtering Approach", IEEE Transactions on Image Proc. 1999, pp. 529-541, vol. 8—Iss 3.

Favaro, Paolo, "Depth from focus/defocus, http://homepages.inf.ed.ac.uk/rbf/Cvonline/LOCAL_COPIES/FAVARO1/dfdtutorial.html.", 2002.

Feng, J. et al., "Adaptive block matching motion estimation algorithm using bit plane matching", ICIP, 1995, pp. 496-499.

Final Office Action mailed Nov. 5, 2008, for U.S. Appl. No. 10/986,562, filed Nov, 10, 2004.

Final Office Action mailed Nov. 13, 2008, for U.S. Appl. No. 10/985,657, filed Nov. 10, 2004.

Final Office Action mailed Nov. 13, 2008, for U.S. Appl. No. 11/586,180, filed Dec. 1, 2006.

Final Office Action mailed Nov. 24, 2008, for U.S. Appl. No. 10/985,650, filed Nov. 10, 2004.

Fujita K. et al., An edge-adaptive iterative method for image restoration, Singapore ICCS/ISITA '92, "Communications on the Move" Singapore Nov. 16-20, 1992, New York, NY, USA, IEEE, US, pp. 361-365, XP010066997, ISBN: 0-7803-0803-4.

Jansson, Peter A., "Chapter 1: Convolution and Related Concepts", Deconvolution of Images and Spectra, 1997, 2nd. Edition, Academic Press.

Jiang, Wei et al., "Dense Panoramic Imaging and 3D Reconstruction by Sensors Fusion, http://rlinks2.dialog.com/NASApp/ChannelWEB/DialogProServlet?ChName=engineering", Japan Sci. and Technol. Agency, JPN(JST); National Inst. Industrial Safety, JPN Nippon Kikai Gakkai Robotikusu, Mekatoronikusu Koenkai Koen Ronbunshu (CD-ROM), 2006, pp. 2P1-C15.

Ko, S. et al., "Fast digital image stabilizer based on gray-coded bit-plane matching", IEEE Transactions on Consumer Electronics, 1999, pp. 598-603, vol. 45—Issue 3.

Lane et al., "Automatic multidimensional deconvolution", J. Opt. Soc. Am. A, 1987, pp. 180-188, vol. 4—Issue 1.

Lhuillier, M. et al., "A quasi-dense approach to surface reconstruction from uncalibrated images, http://rlinks2.dialog.com/NASApp/ChannelWEB/DialogProServlet?ChName=engineering", IEEE Transactions on Pattern Analysis and Machine Intelligence, 2005, pp. 418-433, vol. 27—Issue 3, IEEE Comput. Soc.

Lu Yuan et al, "Image Deblurring with Blurred/Noisy Image Pairs," SIGGRAPH07, Aug. 5-9, 2007.

Lyndsey, Pickup et al., "Optimizing and Learning for Super-resolution," BMVC, Sep. 4-7, 2006.

Mase, Mitsuhito et al., "A Wide Dynamic Range CMOS tmage Sensor with Multiple Exposure-Time Signal Outputs and 12-bit Column-Parallel Cyclic A/D Converters", IEEE Journal of Solid-State Circuits, 2005, vol. 40—Issue 12.

Natarajan B. et al., "Low-complexity block-based motion estimation via one-bit transforms", IEEE Trans. Circuit Syst. Video Technol, 1997, pp. 702-706, vol. 7—Issue 5.

Non-Final Office Action mailed Apr. 3, 2008, for U.S. Appl. No. 10/985,650, filed Nov. 10, 2004.

Non-Final Office Action mailed Apr. 4, 2008, for U.S. Appl. No. 10/986,562, filed Nov. 10, 2004.

Non-Final Office Action mailed Apr, 21, 2009, for U.S. Appl. No. 10/985,650, filed Nov, 10, 2004.

Non-Final Office Action mailed Apr. 22, 2009, for U.S. Appl. No. 10/986,562, filed Nov. 10, 2004.

Non-Final Office Action mailed Jun. 1, 2009, for U.S. Appl. No. 10/985,657, filed Nov. 10, 2004.

Non-Final Office Action mailed Jun. 10, 2009, for U.S. Appl. No. 11/566,180, filed Dec. 1, 2006.

Non-Final Office Action mailed Mar. 18, 2008, for U.S. Appl. No. 10/985,657, filed Nov. 10, 2004.

Non-Final Office Action mailed Mar. 21, 2008, for U.S. Appl. No. 11/566,180, filed Dec. 1, 2006.
Non-Final Office Action mailed May 11, 2009, for U.S. Appl. No. 12/199,680, filed Aug. 27, 2005.
Non-Final Office Action mailed May 29, 2009, for U.S. Appl. No. 12/199,710, filed Aug. 27, 2008.
Oppenheim, A.V. et al., "The Importance of Phase in Signals, XP006060042, ISSN: 0018-9219.", Proceedings of the IEEE, 1981, pp, 529-541, vol. 69—Issue 5.
Park, Sung Cheol et al., "Super-resolution image reconstruction: a technical overview, ISSN: 1053-5888. DOI: 10.1109/MSP.2003.1203207.", Signal Processing Magazine, 2003, pp. 21-36, vol. 20—Issue 3, IEEE Publication.
Patti A. et al., "Super-Resolution video reconstruction with arbitrary sampling lattices and non-zero aperture time http://citeseer.ist.psu.edu/patti97super.html", In IEEE Transactions on Image Processing, 1997, pp. 1064-1078.
PCT International Preliminary Report on Patentability for PCT Application PCT/US2007/069638, dated Dec. 10, 2008, 5 pages.
PCT International Preliminary Report on Patentability, for PCT Application No. PCT/EP2005/011011, dated Jan. 22, 2007, 8 pages.
PCT Notification of Transmittal of the International Search Report and the Written Opinion of the International Searching Authority, or the Declaration for PCT application No. PCT/US2007/069638, dated Mar. 5, 2008, 9 pages.
PCT Notification of Transmittal of the International Search Report and the Written Opinion of the International Searching Authority, or the Declaration, for PCT Application No. PCT/EP2007/009939, dated May 21, 2008, 13 pages.
PCT Notification of Transmittal of the International Search Report and the Written Opinion of the International Searching Authority, or the Declaration, for PCT Application No. PCT/EP2008/004729, dated Oct. 29, 2008, 9 pages.
PCT Written Opinion of the International Preliminary Examining Authority, PCT/EP2005/011011, dated Oct. 24, 2006, 4 pages.
Pulli, Kari et al., "Robust Meshes from Multiple Range Maps, http://citeseer.ist.psu.edu/pulli97robust.html", In Proc. IEEE International Conference on Recent Advances in 3-D Digital Imaging and Modeling, 1997.
Rahgozar et al., "Motion Estimation Based on Time-Sequentially Sampled Imagery", IEEE Transactions on Image Processing, 1995.
Rav-Acha, A. et al., "Restoration of Multiple Images with Motion Blur in Different Directions, XP002375829, ISBN: 0-7695-0813-8", Proceedings Fifth IEEE Workshop on Applications on Computer Vision IEEE Cornput. Soc, 2000, pp. 22-28.
Sasaki et al., "A Wide Dynamic Range CMOS Image Sensor with Multiple Short-Time Exposures", IEEE Proceedings on Sensors, 2004, pp. 967-972, vol. 2.
Sauer, K. et al., "Efficient Block Motion Estimation Using Integral Projections", IEEE Trans. Circuits, Systems for video Tech, 1996, pp. 513-518, vol. 6—Issue 5.
Schultz, Richard R. et al., "Extraction of High-Resolution Frames from Video Sequences, http://citeseer.ist.psu.edu/schultz96extraction.html", IEEE transactions on image processing, 1996, pp. 996-1011.
Seldin et al., "Iterative blind deconvolution algorithm applied to phase retrieval", J. Opt. Soc. Am. A, 1990, pp. 428-433, vol. 7—Issue 3.
She, Peng et al., "Motion View Reconstruction Method with Real Object Image based on Video Virtual Object Movement, http://rlinks2.dialog.com/NASApp/ChannelWEB/DialogProServlet?ChName=engineering", Eizo Joho Media Gakkai Gijutsu Hokoku, 2005, pp, 67-70, vol. 29—Issue 17.
Siu, Angus et al., "Image registration for image-based rendering, http://rlinks2.dialog.com/NASApp/ChannelWEB/DialogProServlet?ChName=engineering", IEEE Transactions on Image Processing, 2005, pp. 241-252, vol. 14—Issue 2.
Trussell, H.J. et al., "Identification and restoration of spatially variant motion blurs in sequential images, XP002375828", IEEE Transactions on Image Processing, 1992, pp. 123-126, vol. 1—Issue 1.

Uomori, K. et al., "Automatic image stabilizing system by fulldigital signal processing" IEEE Transactions on Consumer Electronics, 1990, vol. 36, No. 3, pp. 510-519.
Zhang, Junping et al., "Change detection for the urban area based on multiple sensor information fusion, http://rlinks2.dialog.com/NASApp/ChannelWEB/DialogProServlet?ChName=engineering", IEEE International Geoscience and Remote Sensing Symposium, 2005, p. 4, IEEE.
PCT Notification of Transmittal of the International Search Report and the Written Opinion of the International Searching Authority, or the Declaration, for PCT Application No. PCT/EP2010/056999, dated Sep. 1, 2010, 7 Pages.
PCT Notification of Transmittal of the International Search Report and the Written Opinion of the International Searching Authority, or the Declaration, for PCT Application No. PCT/EP2005/011011, dated Apr. 24, 2006, 12 pages.
PCT International Preliminary Report on Patentability, for PCT Application No. PCT/EP2009/008674, dated Jun. 14, 2011, 7 pages.
PCT Notification of the Transmittal of the International Preliminary Report on Patentability, Chapter II, for PCT Application No. PCT/EP2007/009939, dated Nov. 16, 2009, 12 pages.
PCT International Search Report and the Written Opinion of the International Searching Authority, for PCT Application No. PCT/EP2007/009939, dated May 21, 2008, 12 pages.
PCT Notification of Transmittal of International Search Report and the Written Opinion of the International Searching Authority, or the Declaration, for PCT Application No. PCT/EP2008/004729, dated Oct. 29, 2008, 14 pages.
PCT Written Opinion of the International Search Authority, for PCT Application No. PCT/EP2008/004729, dated Dec. 17, 2009, 9 pages.
PCT International Preliminary Report on Patentability Chapter I (IB/373), for PCT Application No. PCT/EP2008/004729, dated Dec. 17, 2009, 10 pages.
PCT Notification of Transmittal of International Search Report and the Written Opinion of the International Searching Authority, or the Declaration, for PCT Application No. PCT/US2007/069638, dated Mar. 5, 2008, 9 pages.
John C. Russ: Chapter 3: Correcting Imaging Defects. In The Image Processing Handbook, 2002, by CRC Press, LLC. 75 Pages.
Mejdi Trimeche, Dmitry Paliyb, Markku Vehvilainena, Vladimir Katkovnikb, Multichannel image deblurring of raw color components, Computational Imaging III. Edited by Bouman, Charles A.; Miller, Eric L. Proceedings of the SPIE, vol. 5674, pp. 169-178 (2005).
Moshe Ben-Ezra, Shree K. Nayar, Motion Deblurring Using Hybrid Imaging, CVPR, vol. 1, 2003 IEEE Computer Society Conference on Computer Vision and Pattern Recognition (CVPR '03)—vol. 1, 2003, 8 Pages.
Xinqiao Liu and Abbas El Gamal, Photocurrent Estimation from Multiple Non-destructive Samples in a CMOS Image Sensor, In Proceedings of the SPIE Electronic Imaging '2001 conference, vol. 4306, San Jose, CA, Jan. 2001. pp. 450-458.
Final Office Action mailed Jul. 8, 2011 for U.S. Appl. No. 12/137,113, filed Jun. 11, 2008.
Non-Final Office Action mailed Apr. 8, 2011, for U.S. Appl. No. 12/330,719, filed Dec. 9, 2008.
Non-Final Office Action mailed Apr. 8, 2011, for U.S. Appl. No. 12/901,577, filed Oct. 11, 2010.
Non-Final Office Action mailed Dec. 7, 2010, for U.S. Appl. No. 11/764,578, filed Jun. 18, 2007.
Non-Final Office Action mailed Jan. 21, 2011, for U.S. Appl. No. 12/137,113, filed Jun. 11, 2008.
Non-Final Office Action mailed Mar. 21, 2011, for U.S. Appl. No. 12/702,092, filed Feb. 8, 2010.
Final Office Action mailed Jul. 18, 2011 for U.S. Appl. No. 12/755,338, filed Apr. 6, 2010.
Final Office Action mailed Apr. 25, 2011, for U.S. Appl. No. 11/856,721, filed Sep. 18, 2007.
Final Office Action mailed Mar. 25, 2011, for U.S. Appl. No. 11/764,578, filed Jun. 18, 2007.

* cited by examiner

| 310 | 320 | 310 | 320 | 310 | 320 | | Proposed frame acquisition |

FIG. 3

| 410 | 420 | 412 | 410 | 420 | 412 | | Proposed frame acquisition |

FIG. 4

Multiple SET frames combined firstly with an FET frame; then with sequential output video frames to obtain a plurality of output video frames from a single originaly FET frame.

LOW-LIGHT VIDEO FRAME ENHANCEMENT

RELATED APPLICATIONS

This application is a Continuation-in Part (CIP) of U.S. patent application Ser. No. 12/330,719, filed Dec. 9, 2008, which is a CIP of U.S. Ser. No. 11/856,721, filed Sep. 18, 2007, which claims priority to U.S. provisional application No. 60/893,116, filed Mar. 5, 2007. This application is also related to U.S. Ser. No. 12/336,416, filed Dec. 16, 2008; and U.S. Ser. No. 11/753,098, filed May 24, 2007; and U.S. Ser. No. 12/116,140, filed May 6, 2008. All of these related applications are assigned to the same assignee and are hereby incorporated by reference.

BACKGROUND

1. Field of the Invention

The present invention relates to an image processing method and apparatus.

2. Description of the Related Art

Sensor arrays for digital cameras exist for capturing color photos. Sensors known as RGBW sensors are used for capturing red, green, and blue colors, and for capturing luminance information for multiple pixels of an array of pixels. The red, green and blue pixels include filters such that only certain narrow ranges of wavelengths of incident light are counted. The white pixels capture light of red, green and blue wavelengths, i.e., of a broader range of wavelengths than any of the blue, green and red pixels. Thus, the white pixels are typically brighter than any of the blue, red and green pixels if they are exposed for the same duration.

Noise removal algorithms can tend to blur face regions in an undesirable manner. Noise removal algorithms are described at U.S. patent application Ser. Nos. 11/856,721 and 11/861,257, which are hereby incorporated by reference, as are U.S. Ser. Nos. 10/985,650, 11/573,713, 11/421,027, 11/673,560, 11/319,766, 11/744,020, 11/753,098, 11/752,925, and 12/137,113, which are assigned to the same assignee as the present application and are hereby incorporated by reference.

Kodak has developed a RGBW color filter pattern differing from the previously known Bayer Color Filter. The RGBW pattern of Kodak is referred to as a Color Filter Array (CFA) 2.0. One half of cells in a RGBW pattern are panchromatic, i.e. sensing all of the color spectrum (Y component)—usually called white cells. This way more light energy is accumulated in the same amount of time than for color pixels. A Bayer filter uses only ⅓ (~0.33) of color spectrum energy. An RGBW filter uses ⅔ (~0.67) of the energy, where ½ comes from white cells and ⅙ from RGB cells.

CFA Array looks something like the following:
WBWG . . .
BWGW . . .
WGWR . . .
RWRW . . .

In this context, the following are incorporated by reference: U.S. Pat. Nos. 7,195,848, 7,180,238, 7,160,573, 7,019,331, 6,863,368, 6,607,873, 6,602,656, 6,599,668, 6,555,278, 6,387,577, 6,365,304, 6,330,029, 6,326,108, 6,297,071, 6,114,075, 5,981,112, 5,889,554, 5,889,277, 5,756,240, 5,756,239, 5,747,199, 5,686,383, 5,599,766, 5,510,215, 5,374,956, and 5,251,019.

Two source images nominally of the same scene may be used to produce a single target image of better quality or higher resolution than either of the source images.

In super-resolution, multiple differently exposed lower resolution images can be combined to produce a single high resolution image of a scene, for example, as disclosed in "High-Resolution Image Reconstruction from Multiple Differently Exposed Images", Gunturk et al., IEEE Signal Processing Letters, Vol. 13, No. 4, April 2006; or "Optimizing and Learning for Super-resolution", Lyndsey Pickup et al, BMVC 2006, 4-7 Sep. 2006, Edinburgh, UK, which are hereby incorporated by reference. However, in super-resolution, blurring of the individual source images either because of camera or subject motion are usually not of concern before the combination of the source images.

U.S. Pat. No. 7,072,525, incorporated by reference, discloses adaptive filtering of a target version of an image that has been produced by processing an original version of the image to mitigate the effects of processing including adaptive gain noise, up-sampling artifacts or compression artifacts.

US published applications 2006/0098890, 2007/0058073, 2006/0098237, 2006/0098891, European patent EP1779322B1, and PCT Application No. PCT/EP2005/011011 (Ref: FN109), which are each hereby incorporated by reference, describe uses of information from one or more presumed-sharp, short exposure time (SET) preview images to calculate a motion function for a fully exposed higher resolution main image to assist in the de-blurring of the main image.

Indeed many other documents, including US 2006/0187308, Suk Hwan Lim et al.; and "Image Deblurring with Blurred/Noisy Image Pairs", Lu Yuan et al, SIGGRAPH07, Aug. 5-9, 2007, San Diego, Calif., which are incorporated by reference, are directed towards attempting to calculate a blur function in the main image using a second reference image before de-blurring the main image.

Other approaches, such as may be disclosed in US2006/0017837, which is incorporated by reference, involve selecting information from two or more images, having varying exposure times, to reconstruct a target image where image information is selected from zones with high image details in SET images and from zones with low image details in longer exposure time images.

Nowadays, even though image processing techniques have evolved, still low-light scenes tend to lead to very dark frames in videos. By these means the visual quality is low. A solution to this problem is provided herein.

SUMMARY OF THE INVENTION

A method of combining image data from multiple frames to enhance one or more parameters of video image quality is provided, which uses a processor and at least one video acquisition system including a lens and an image sensor. The method includes acquiring a first image at a first exposure duration, as well as acquiring a second image at a second exposure duration shorter than the first exposure duration and at a time just before, just after or overlapping in time with acquiring the first image, such that the first and second images include approximately a same first scene. In this way, the second image is relatively sharp and under-exposed, while the first image is relatively well-exposed and less sharp than the second image. Brightness and/or color information are extracted from the first image and applied to the second image. The brightness and/or color information is/are extracted from the first image to generate an enhanced version of the second image enhanced in terms of brightness and/or color quality. The enhanced version of the second image is displayed, stored, transmitted, and/or streamed within a video sequence.

The method may further include applying to one or more further images the brightness and/or color information extracted from the first image to generate enhanced versions of the one or more further images enhanced in terms of brightness and/or color quality. The one or more further images may be acquired at or near the second exposure duration and at a time or times just before or just after, or both, the acquiring of the second image, such that the one or more further images include approximately the same scene as the first and second images.

The method may also include acquiring a third image at or near the first exposure duration when a predetermined number of multiple frames has been recorded since the acquiring of the first image. A fourth image may also be acquired at or near the second exposure duration and at a time just before, just after or overlapping in time with the third image, such that the third and fourth images include approximately a same second scene different from or same as the first scene. Brightness and/or color information are extracted from the third image, and applied to the fourth image to generate an enhanced version of the fourth image enhanced in terms of brightness and/or color quality. The enhanced version of the fourth image is displayed, stored, transmitted, and/or streamed within a video sequence.

The method may further include acquiring a third image at or near the first exposure duration when a predetermined amount of camera movement has been detected since the acquiring of the first image. A fourth image may be acquired at or near the second exposure duration and at a time just before, just after or overlapping in time with the third image, such that the third and fourth images include approximately a same second scene different from the first scene due at least to the camera movement. Brightness and/or color are extracted from the third image, and applied to the fourth image to generate an enhanced version of the fourth image enhanced in terms of brightness and/or color quality. The enhanced version of the fourth image is displayed, stored, transmitted, and/or streamed within a video sequence.

The method may also include acquiring a third image at or near the first exposure duration including combining some of the data from the first image with some or all of the data from the second image. A fourth image may be acquired at or near the second exposure duration and at a time just before, just after or overlapping in time with the third image, such that the third and fourth images include approximately the same first scene. Brightness and/or color information are extracted from the third image and applied to the fourth image to generate an enhanced version of the fourth image enhanced in terms of brightness and/or color quality. The enhanced version of the fourth image is displayed, stored, transmitted, and/or streamed within a video sequence. The method may include repeatedly iterating the method as the scene evolves with time and/or camera movement.

The method may include iteratively alternating acquisition of well-exposed and sharp, under-exposed images; extracting brightness and/or color information from the well-exposed images; and applying to the sharp, under-exposed images the brightness or color information, or both, extracted from the well-exposed images to generate enhanced versions of the sharp, under-exposed images enhanced in terms of brightness or color quality, or both; and displaying, storing, transmitting, or streaming the enhanced versions of the sharp, under-exposed images within said video sequence.

The method may also include iteratively performing the following:
acquiring two sharp, under-exposed frames and a well-exposed frame;
extracting brightness and/or color information from the well-exposed frame;
applying to each pair of sharp, under exposed images respectively captured immediately before and immediately after the acquiring of each well-exposed frame the brightness and/or color information extracted from the well-exposed frame to generate enhanced versions of each of the pair of sharp, under-exposed images enhanced in terms of brightness and/or color quality; and
displaying, storing, transmitting, or streaming within said video sequence the enhanced versions of the pair of sharp, under-exposed images.

The method may utilize separate image acquisition sub-systems (IAS's) for acquiring the first and second images. The separate IAS's may include first and second IAS's, wherein the first IAS is configured to acquire images at a faster frame rate than the second IAS. The first IAS may be specially configured to capture relatively sharp, under-exposed images and the second IAS may be specially configured to capture well-exposed and less sharp images. The first IAS may have a fixed frame rate. The second IAS may have a variable frame rate configured for capturing optimally-exposed images under different lighting conditions. The method may include acquiring both the first and second images with a same lens as optical input, and splitting the optical input between first and second image sensors. The method may alternatively include acquiring the first and second images, respectively, with a first lens/sensor combination and a second lens/sensor combination. In this alternative, parallax correction may be applied.

A digital video acquisition system is also provided, including a lens, an image sensor for capturing a stream of multiple video images, a processor and a memory having processor-readable code embedded therein for programming the processor to perform any of the methods described above or below herein.

One or more processor-readable media is/are also provided which have processor-readable code embedded therein for programming one or more processors to perform any of the methods described above or below herein.

Frame 3 schematically illustrates video frame enhancement using luminance and/or color data from a well-exposed image, and applying die data to a relatively less exposed, sharper image in accordance with a second embodiment.

FIG. 4 schematically illustrates video frame enhancement using luminance and/or color data from a well-exposed image, and applying the data to a relatively less exposed, sharper image in accordance with a third embodiment.

FIGS. 5a-5d schematically illustrate video frame enhancement using luminance and/or color data from a well-exposed image, and applying the data to a relatively less exposed, sharper image in accordance with a fourth embodiment which involves at least two image acquisition sub-systems, so that the well exposed image is captured with a first sub-system while the sharper image is captured with a second sub-system.

DETAILED DESCRIPTIONS OF THE EMBODIMENTS

Several embodiments are described below that use a pair of images to enhance one of them. Alternative embodiments may be obtained by combining features of two or more of these embodiments, or by combining features of one or more of the embodiments with features described in the background or in any of the references cited there or hereinbelow. In certain embodiments, one of the pair of images is the target image (which is sharp but under exposed and noisy), and another image is the reference image (which is well-exposed but blurred, e.g., motion blurred). In specific embodiments, the use of the method if dedicated to improving the quality of video-frames acquired in scenes with low light.

For ensuring animation (motion, fluency), the frame-rate in a video is generally over a predetermined threshold (e.g., 12 frames/sec). This imposes a maximum exposure time for each frame. In low light conditions, this exposure time is not-sufficient for offering good visual quality. Several embodiments are provided herein as solutions to overcome this problem. Several methods of improving video capture in low-light are provided by applying techniques to a continuous sequence of images. Three embodiments generally incorporate modified image processing within a conventional video camera or any later generation camera, while a fourth embodiment involves a video camera that incorporates two distinct image acquisition subsystems.

Image+Video

Figure 1:
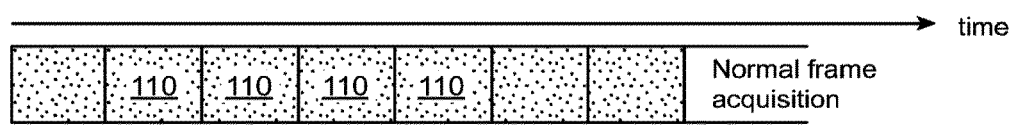
FIG. 1 schematically illustrates conventional video frame acquisition.

FIG. 1 schematically illustrates a conventional frame acquisition process. According to the illustration of FIG. 1, multiple video frames 110 are sequentially acquired each with a same exposure duration.

Figure 2:
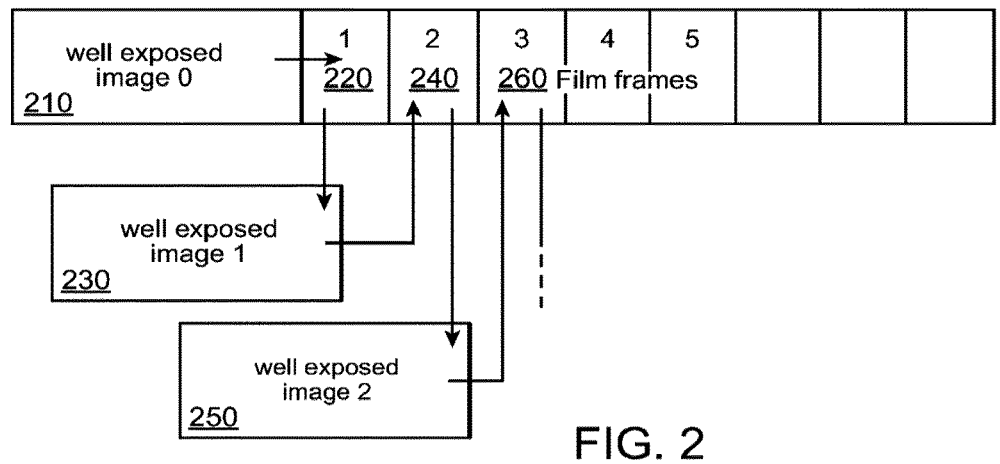
FIG. 2 schematically illustrates video frame enhancement using luminance and/or color data from a well-exposed image, and applying the data to a relatively less exposed, sharper image in accordance with a first embodiment.

FIG. 2 schematically illustrates use of frames with different exposure durations. A well-exposed frame 210 is acquired at a beginning of a video acquisition. From this well-exposed image 210, one may extract brightness and/or color information that are used to enhance the next frame 220. The next frame 220 is exposed using an exposure determined from a maximum frame-rate. The frame 220 is enhanced with brightness and/or color information extracted from the well exposed frame 210.

The frame 220 may be displayed (included in the video) and may be used for determining or generating another reference image 230 that may itself be used to enhance the next acquired frame 240 (frame 2). The reference frame 230 may be generated as a combination of the first acquired frame 210 and the second acquired frame 220.

The next acquired frame 240 is enhanced with brightness and/or color information extracted from the generated well exposed frame 230. The frame 240 may be displayed (included in the video) and may be used for determining or generating another reference image 250 that may itself be used to enhance the next acquired frame 260. The reference frame 250 may be generated as a combination of the generated frame 230 and the third acquired frame 240. The frame 260 may be displayed (included in the video) and the process may be repeated over a complete vide sequence.

The acquisition of the well exposed image may be repeated at certain times. A digital camera may be used that has an auto-exposure algorithm that runs in the video mode. The best exposure time for a frame may be estimated in-camera. The camera may be configured such that a well exposed image may be acquired only when the auto-exposure demands a period larger than the one imposed by the maximum frame rate.

If the entire video is acquired in low light then the amount of time when it is needed to repeat the image acquisition may depend on camera movement. This may be estimated by registration techniques. An example method may be performed by a processor as follows:

1. Test for Low-Light Case: the auto-exposure determined time is approximately equal to the maximum frame rate. The test should run continuously no matter which is the current case.
2. When the conditions are such that it is not a Low-Light Case, then normal acquisition may be performed with record of any well exposed image.
3. When the conditions are such that it is a Low-Light Case, then:
    a. Acquire a well exposed image and iteratively run the enhancing method for each video frame;
    b. Estimate the camera movement by performing registration on the recorded frames. If the motion is larger than a threshold (the image content has significantly changed, e.g., 30% from the last well exposed image), then acquire a new well-exposed image; and
    c. If a certain number of video frames (e.g., M=5, 10, 20, 30, 40, 50, 60, 75, or 100 or more) has been recorded from the last well-exposed image, then acquire a new well exposed image.

Video Frame Pairs with Modified Exposure Time

FIG. 3 schematically illustrates use of video frame pairs with modified exposure times. In an example embodiment, we will consider only a video. The exposure times of the frames are modified from the example of FIG. 1 to provide a better response to a low-light scene. Traditionally, the exposure times of all the frames are equal (with $t_0$) as illustrated at FIG. 1. In the example of FIG. 3, the images may be grouped in pairs 210, 220, wherein the exposure time of a pair is $2t_0$, just as are two frames 110 in FIG. 1. FIG. 3 differs from FIG. 1, however, because for a pair in FIG. 3, there is an under-exposed frame 310 (with exposure time $kt_0$, $k<1$) and an "over-exposed" image 320 (with exposure time of $(2-k)t_0$). The "over-exposed" frames 320 are used for a better detection of the appropriate luminance level and of the color gamut, and therefore to enhance the under-exposed frames 310.

Choosing k: The enhancement method has a limitation. There is a maximum difference between the exposures of the two images (well exposed 320 and under-exposed frame 310), when the method works optimally. If the exposure difference is larger than this limit, the under-exposed image 310 will have more noise than is typically tolerated in a useful signal. The k is preferably chosen as small as possible (to expose as well as possible the "swell-exposed image" 320), but its value is preferably kept in the mentioned method limits. Also, the exposure time of the well-exposed image 320, $(2-k)t_0$, is preferably not larger than the value chosen by the auto-exposure (which may be used as a global reference).

Video Frame Triplets with a Single Well Exposed Image

FIG. 4 schematically illustrates a further embodiment which uses video frame triplets including one (or more) well-exposed image(s) 420 each with two or more under-exposed frames 410, 412. This embodiment provides a natural extension of the previous one described above with reference to FIG. 3, because the enhancement method illustrated at FIG. 3 does not require an order of the two images 310, 320. Therefore, the luminance and/or color information from the well exposed image 420 may be used to enhance the previous frame 410, as well as in the next frame 412. In such a scheme, as illustrated at FIG. 4, the maximum exposure may reach higher values, and the overall frame rate may be better from the point of view of the edges. In principle, each well-exposed image 420 may be used to enhance still further combinations of under-exposed images, e.g., two before and/or two after, or one before and two after, or one after and two before, or three before and/or after, etc.

Dual Frame Acquisition Pipeline

FIGS. 5a-5d schematically illustrate dual frame acquisition pipeline embodiments. FIGS. 5a-5d schematically illustrate video frame enhancement involving use of luminance and/or color data from a well-exposed image, and applying the data to one or more relatively less exposed, sharper image(s). FIGS. 5a-5d illustrate four alternative examples that are each in accordance with a fourth embodiment which involves at least two image acquisition sub-systems, where the time parameter is understood to go from left to right in FIGS. 5a-5d from earlier to later. In general, a well exposed image is captured with a first image acquisition sub-system that is optimized for longer exposure, while a relatively less exposed and sharper image is captured with a second sub-system that is particularly optimized for sharpness.

Figure 5A:
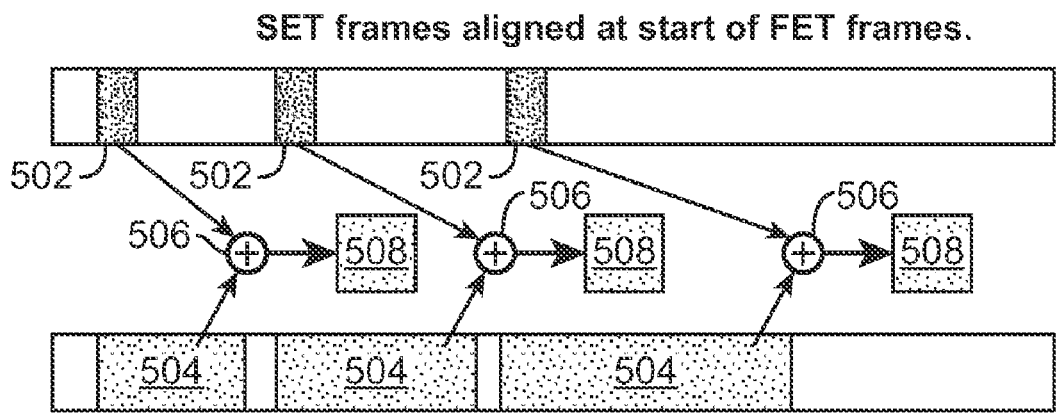
Figure 5B:
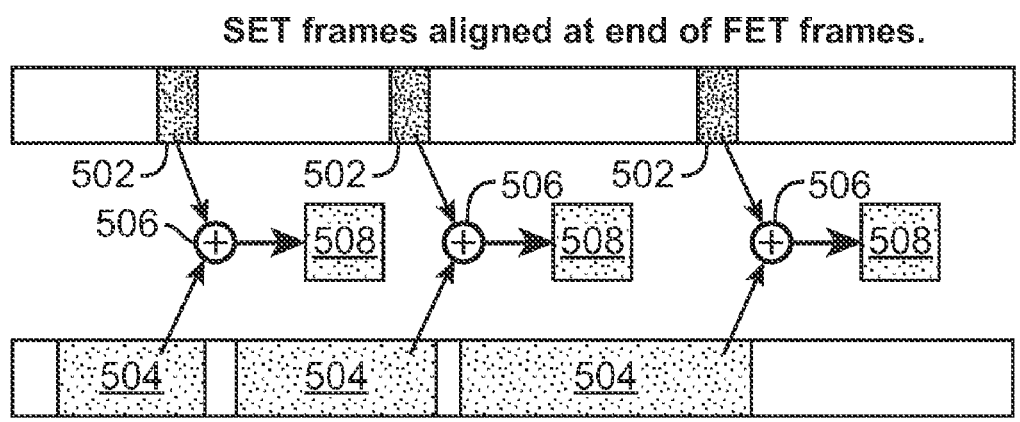

FIG. 5a illustrates short-exposure time (SET) frames 502 which are sharp, but underexposed. These frames 502 are aligned with the start of the full exposure time (FET) frames 504 with normal exposure, full color, but blurred. These frames 502, 504 are combined to generate enhanced video frames 508. FIG. 5b shows the case where the SET frames 502 are acquired towards the end of the FET frames 504. This illustrates that SET frames 502 can be acquired any time during the FET frame 504 in this embodiment.

FIGS. 5a-5b illustrates an embodiment wherein the elements 502 indicate video frames 502 that are acquired with shorter exposure times than element 504. This can be understood from the narrower extent of the frames 502 in the time dimension than the frames 504. The frames 504 are exposed for two to ten times as long (or longer, or just under 2× in some embodiments) compared with the frames 502, while in FIGS. 5a-5d the frames 504 are about 5× wider than the frames 502 indicating an exposure time of about 5× longer than for frames 504. The image combining unit (ICU) 506 combines luminance and/or color information from the frames 504 to enhance the frames 502. The combinations are images 508.

In FIG. 5a, each image 502 is acquired beginning about the same time as a corresponding image 504, even though the exposure of image 502 is ended longer before the exposure of image 504 is ended. In FIG. 5b, each image 502 is acquired in the last moment of acquisition of a corresponding frame 504, i.e., the exposures of the two IAS's are ended at about the same time even though the exposure of frame 504 was begun far sooner than that of image 502. Another embodiment would have the exposure of image 504 begin before the beginning of the exposure of image 502, and the exposure of image 502 is ended before the exposure of image 504 is ended, i.e., the frame 502 is acquired in the somewhere in the middle of the exposure of frame 504.

Figure 5C:
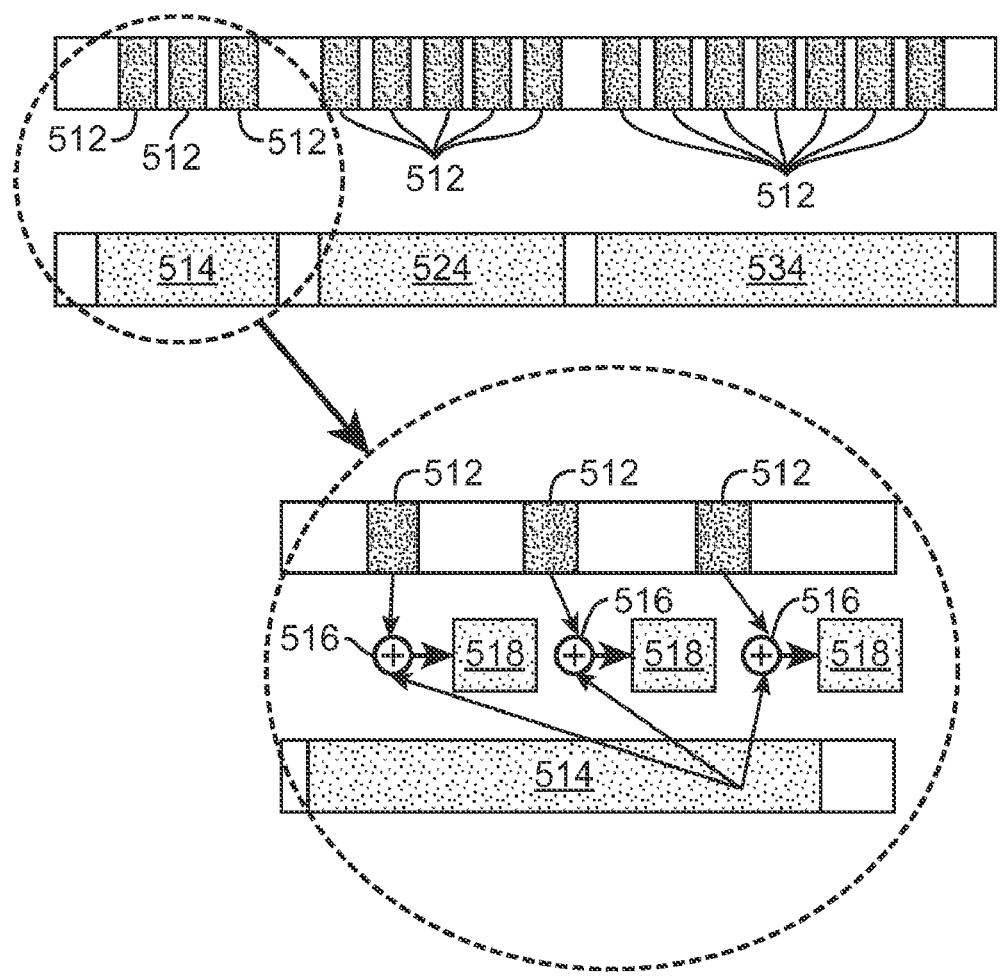
Figure 5D:
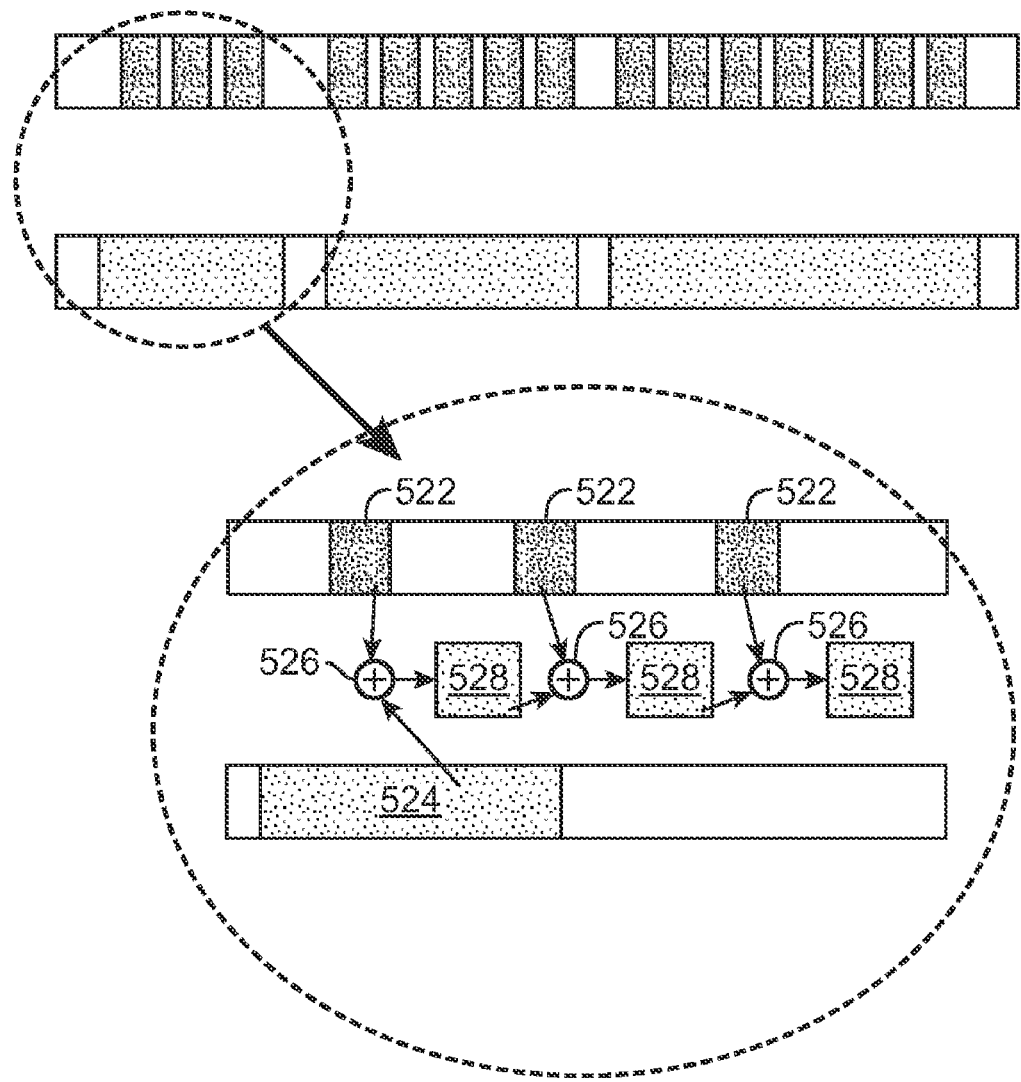

FIG. 5c illustrates a case of multiple SET frames 512 acquired within an exposure duration of a single FET frame 514. Each SET frame 512 can act as a "sharpening reference" for the FET frame 514 enabling multiple enhanced video frames to be resolved. This is advantageous for example in very low light, where it might take as long as 0.5 seconds for a sensor to achieve a full exposure. Using multiple SETs 512 within that 0.5 seconds permits a reasonable frame rate of 10-15 fps to be achieved with enhanced output frames in terms of sharpness, color and/or luminance.

FIG. 5c schematically illustrates a further embodiment where multiple, e.g., three, short exposure time (SET) frames 512 are acquired while a single longer exposure time frame (FET) 514 is acquired. In another example, five short exposure time frames 512 are acquired while a single longer exposure time frame 524 is acquired. In another example, seven short exposure time frames 512 are acquired while a single longer exposure time frame 534 is acquired. Alternatively, the shorter exposure time frames could be varied as well. In the first example of three SETs per FET, the ICU 516 combines the color and/or luminance information from frame 514 with each of the three frames 512 that were acquired during the exposure duration of the frame 514. The results are the three output images 518.

In FIG. 5c, the second (and subsequent) SET frames 512 could be combined with the first output video frame 518 rather than with the main FET frame 514 in the same way as an embodiment of the single acquisition channel aspect. Thus, in the example of FIG. 5d, the SETs and FETs may be similar to those described with reference to FIG. 5c. In this example, the color and/or luminance information initially extracted from frame 524 is applied to 522 at ICU 526 to get a first processed frame 528. In this example, color and/or luminance information is extracted from that first processed frame 528 and combined at ICU 526 with one or more subsequent shorter exposure frames 522 to get one or more subsequent processed frames 528. This example is particularly applicable also to the single IAS embodiment except without having temporal overlap.

In this fourth embodiment, a video camera incorporates two distinct image acquisition subsystems (IAS). In certain embodiments, each of the two IAS's includes at least an image sensor & (digital) post-processing components.

The first IAS may have an image sensor configured to acquire images at a higher frame rate and with optimal image sharpness. The frame rate for this first sensor may optionally be fixed and it may optionally incorporate an image buffer to temporarily store a plurality of these sharp images.

The second image acquisition subsystem may be configured to capture an optimally exposed image. As such, it should have a variable frame rate to allow for correct image exposure, even in low lighting conditions.

A timing or clocking unit may be used to maintain temporal synchronization between the two IAS's and to ensure that images in the fast IAS image buffer can be correctly matched to images obtained from the optimally exposed IAS. This timing function may be implemented either as a hardware unit, or as part of the firmware of a main CPU or DSP.

An additional image combining unit (ICU) selects one (or more) images from the fast IAS buffer and a corresponding image from the optimally exposed IAS buffer. The ICU may perform various operations such as those described at U.S. Ser. Nos. 12/330,719 and/or 11/856,721, which are incorporated by reference. The ICU may also be used with any of the first, second or third embodiments described above with references to FIGS. 2-4. The ICU generates a sequence of output images which combine the one or more sharper, underexposed images from the fast IAS buffer with the single optimally exposed image obtained from the optimally exposed IAS.

The system of the fourth embodiment may acquire images of both the fast IAS and the optimally exposed IAS with a same lens as optical input. That input is then split first and second image sensors. Alternatively, images may be acquired separate lens/sensor combinations. Such multiple lens subsystem may include 2, 3, 4 or more lenses. For example, U.S. Pat. No. 7,453,510, which is incorporated by reference, describes a multi-lens subsystem having particular embodiments with four lenses.

Parallax correction may also be provided, as has been provided in the past in "twin reflex" cameras. When the imaging device incorporates a sensor for measuring distance-to-subject, the resulting measure to the principle subject of the image may be employed to further enhance the parallax correction, and/or to determine if such correction is needed. When the imaging device incorporates a face detector and/or a face tracking unit, information regarding the size(s) of face(s) detected in the image may be used to further enhance the parallax correction, and/or to determine if such correction is needed. In general, when a subject is beyond a certain distance or "critical distance" (infinite focal length), e.g., three or four meters in common cameras, then parallax correction loses its advantage.

Techniques described in US published application 2007/0296833 and/or U.S. Ser. No. 12/116,140, which are incorporated by reference, may be combined with features described herein, particularly to improve the acquisition, or pre-processing of the input images to the ICU, and/or to selectively enhance the output images from this unit.

Output images may be subsequently compressed to form an MPEG video sequence. US published application 2007/0025714 is incorporated by reference. In addition, the techniques described herein may be applied to a still image camera, whereas the sequence of images may be preview, post-view and/or in-whole or in-part contemporaneously acquired images that are generally captured to enhance capture conditions and/or post-processing of a main still image.

In a variant of the dual IAS embodiment, both IAS subsystems may share a common image sensor which employs a modified architecture. This embodiment does not have separate optical acquisition subsystems and associated parallax correction which would be involved in capturing close-up or portrait images.

In this variant embodiment, an image sensor may be partitioned such that every second row of sensor pixels is tied to a separate clock circuit. Thus, the acquisition time of the odd-numbered rows of the image sensor can be controlled independently of the even-numbered rows. Similarly the data outputs (pixel values) of these even and odd rows can be loaded onto independent data buses. Thus, by setting different acquisition times for the odd and even rows of sensor pixels, closely overlapping underexposed and normally exposed images may be advantageously acquired. Due to the close proximity of the odd and even pixel rows, there is a small, regular half-pixel offset in either horizontal or vertical orientation which can be compensated for, and as both underexposed and normally exposed images are acquired via that same optics subsystem, there is no parallax correction involved. As in other embodiments, the two independently acquired images may be combined using a single pass adaptive filter.

Bayer Pattern Partitioning of the Sensor

In another embodiment pairs of rows are linked for each of the different exposure times. Thus, an entire RGB Bayer set corresponding to a single RGB pixel will have the same exposure time i.e., rows n+1, n+2 have a short exposure, while rows n+3, n+4 have a normal (less sharp or relatively more blurred) exposure.

Considering the exposure time of the underexposed rows is $T_U$, while for the normally exposed rows is $T_N$, an example acquisition procedure is as follows:

Start exposure for all rows of the image sensor (i.e., for both the underexposed rows and the normally exposed rows);

After $(T_N-T_U)$ seconds, reset (or discharge) the odd rows;

After $T_N$, all the rows are read (i.e., both the underexposed and normally exposed rows). Two images are formed with half resolution; and The underexposed image is interpolated to full resolution.

An example choice is to have $T_N = k\, T_U$, where k is an integer scalar. This means that the normal exposure time is a multiple of the short exposure time. Such constraint may be met, e.g., if the exposure time is reduced by an amount of Ev (or Fstop) values. For instance, an under-exposure with one (1) Fstop implies $T_N = 2\, T_U$. This constraint has at least the following benefits:

Using the same sampling frequency, all the locations (from the image sensor) can be read synchronously;

When all the operations are pixel-wise (or use only pixels from two consecutive rows), there is no need for an extra image buffer. The resulting image is built in real-time, while reading. The interpolation operation is performed locally.

An advantage of this split-sensor acquisition embodiment is that the two images are spatially aligned (insofar as is possible given the constraint that one image is blurred) and hence pixel-wise (for each location independently) operations are possible without a need to acquire and align the entire images.

A further advantage is that the acquisition of the two images can handled by two independent data busses, enabling the two images to be obtained with a close temporal overlap.

Image Mixing

This offers an alternative approach to the combination of the two images using a single pass adaptive filter. In one example, a process may involve the following two steps:

The first step is about combining the underexposed image F and the blurred image G, by some point-wise amplification algorithm to produce an image, called $F_{amp}$, and which has a luminance and color levels at least very close to the ones present in the blurred image G. The resulting image $F_{amp}$ has reasonable, but not perfect, luminance and color levels. Because the amplification is performed on each pixel independently, the amplified image will have the same resolution as the under-exposed image, which is the desired resolution.

As a second step, the final image, $F_{out}$ may be computed as a linear combination (implemented independently on each pixel) between the blurred image, G, and the amplified image $F_1$. An example solution to perform this operation is:

Use the YUV plane for performing the calculus;

A luminance of the output image may be expressed as:

$$Y(F_{out}) = 0.9 * Y(F_{amp}) + 0.1 * Y(G);$$

A color difference plane of the output image may be expressed as:

$$U(F_{out}) 0.3 * U(F_{amp}) + 0.7 * U(G), \quad \text{(i)}$$

$$V(F_{out}) = 0.3 * V(F_{amp}) + 0.7 * V(G). \quad \text{(ii)}$$

The system of the fourth embodiment may be applied to other fields of image processing. For example, improved Dynamic Range Compression (DRC) may be achieved using a pair of symmetrical, synchronized sensors. In this embodiment, one of the pair of symmetrical, synchronized sensors may be used to expose correctly, while the other is used to capture over-exposed images, or under-exposed images. The dark areas, or light areas, can be improved drastically, e.g., in terms of increased sharpness, color balance, and/or white balance, and/or reduced blurriness.

In another example, hand motion compensation and low lighting video/still image enhancement can be improved. In this example, one normally exposed image and another under-exposed image (e.g., half-exposed, one-third exposed, one-quarter exposed, one-fifth exposed, or less). Adaptive filtering may be used to combine the images.

In a further embodiment, a third dimension may be added to an image. This feature can be used in an enhanced face recognition technique, or to render, process, store, transmit or display an improved 3D representation.

In another embodiment, improved face tracking is performed. In this case, two face detections are performed on two different image streams. One detection may be over-exposed (or under-exposed), and the other may be normally exposed. In this case, e.g., back-lit objects and other difficult lighting conditions can be advantageously handled more efficiently and effectively and with improved results.

In another embodiment, red eye detection and correction is improved using a still image version of the dual frame pipeline embodiment. There can appear color exact shifts between pictures obtained by two such sensors. That can provide an advantageous verification filter, e.g., to confirm that detected red pixels are indeed red eye artifacts.

In a further embodiment, foreground/background separation techniques can be enhanced using a dual frame pipeline. For example, one sensor may capture a focused image, while the other is used to capture an at least slightly de-focused image. Advantageous separation between background and foreground can be thereby achieved allowing for the creation of high quality portraits with inexpensive and/or relatively simple optics.

In another example, one sensor may be used to capture IR images or images that include an IR component. Such sensor can be provided by removing an IR filter of certain sensors and/or adding a visible light filter. Such IR sensor would be advantageous in performing image processing and image capture in lowlight conditions, and in a still image embodiment for performing red eye detection and correction.

Other examples include noise reduction and/or processes involving capturing non-scene shot images to be further used as additional camera features. For example, an eye iris analysis tool may be embedded in a digital cameras that has an eyepiece viewfinder. The image of the iris looking through the eyepiece may be captured by the camera CCD, or an additional CCD, after being diverted by one or more optics. The image of the iris may be analyzed and used for biometric user identification (camera lock, digital picture watermarking), inferring lighting conditions, detecting user fatigue, and/or detecting certain symptoms of a medical condition of a user.

A low-resolution camera looking back at a user's face may be embedded in a digital camera. The image of the user's face may be captured by the camera CCD, or an additional CCD, after being acquired and processed by one or more optics. This can be used for face identification for camera usage protection, IP protection for digital pictures, and/or analysis of user emotions based on the face and/or as feed-back of the user emotions into the captured image itself.

In another embodiment that is particularly advantageous for lowlight conditions, a reduced frame rate may sometimes be used in order to increase the exposure duration to gather more light. If multiple sensors are used, e.g., two (although three or more may be used), then a faster frame rate will result in sharper images. For example, even frames may be acquired with one sensor, and odd frames with another sensor (or for three sensors, every third frame is acquired with each of the three sensors, or for four sensors, etc).

The sensors will generally have the same exposure (e.g., for two sensors, the time T may be about twice the frame rate), but one sensor will start acquiring image data at t=0, and the second sensor will start at t=T/2.

Alternative to the previous embodiment that is particularly advantageous for lowlight conditions, instead of or in addition to increasing (or decreasing) exposure time, a larger aperture can be set. While depth of field will be smaller such that a subject with background would be defocused, the frame rate can be advantageously higher than the example of increasing the exposure time. With dual sensors and optical elements, both lenses can be set to large aperture, where one is focused on the background and the other is on the subject. The two resulting pictures can be combined, in one high-frequency picture, where both the subject and background are in focus (the two images are complementary, where one has high frequencies the other has low frequencies). So in low-light, exposure time can be kept short and ISO small, with fully open aperture, wherein two short DoF images are combined into one with good focus both on subject and background.

In a de-noising algorithm, two images can be acquired with one overexposed and the other normally exposed. The normally exposed image may be de-noised using information from the overexposed image. An adaptive algorithm may be used as a function of illumination of the pixels, because lower illuminated pixels exhibit greater noise.

In a further embodiment, a two lens system can be used in another embodiment as follows. One lens may capture certain scenery broadly, e.g., a tourist either standing relatively close to a camera with the Egyptian pyramids far away from the camera and tourist, or the tourist standing further from the camera and closer to the pyramids and looking very small. The other lens is used to zoom and focus on the tourist or other main subject from the scene.

A single file or multiple files may then store the two images. The two images can be acquired at the same time with a system in accordance with the dual image pipeline embodiment, or proximate in time in the single optical system embodiments. An advantage is that, while having a panoramic image, there will still be excellent detail in the main part or subject of the scene (e.g., the tourist or more particularly the face of the tourist). In one embodiment, the wide-angle scene may use a face tracker to determine the location of a face or faces in the scene, and the zoom/aperture of the second imaging system may be adjusted to include people detected in the captured image. In an alternative embodiment, both wide-angle and narrow angle images of the scene may be captured and subsequently combined into one or more composite images. In another embodiment, selective high-quality compression of a face region may be enabled in a portrait (e.g., using a zoom lens), with lower-quality compression applied to the background image (e.g., using a wide-angle lens).

Wavefront coding may also be provided. Variable focus is used for different parts of a lens. Various parts of the lens capture information relating to different focal points. The image is decoded according to known defocus variations and a resulting image has an extended depth of field. CDM Optics have studied this technology, and http://www.cdm-optics.com is incorporated by reference.

Phase retrieval and/or phase diversity may also be provided. Two images are captured simultaneously with a system in accordance with the dual pipeline embodiment. One image is in focus, and another is defocused by a known distance. The two images are recombined and the known defocus distance which distorts the image is used to reconstruct the image with a greater depth of field. A beam splitter could also be used to capture the defocused image to apply phase diversity.

While an exemplary drawings and specific embodiments of the present invention have been described and illustrated, it is to be understood that that the scope of the present invention is not to be limited to the particular embodiments discussed. Thus, the embodiments shall be regarded as illustrative rather than restrictive, and it should be understood that variations may be made in those embodiments by workers skilled in the arts without departing from the scope of the present invention as set forth in the claims that follow and their structural and functional equivalents.

In addition, in methods that may be performed according to preferred and alternative embodiments and claims herein, the operations have been described in selected typographical sequences. However, the sequences have been selected and so ordered for typographical convenience and are not intended to imply any particular order for performing the operations, unless a particular ordering is expressly indicated as being required or is understood by those skilled in the art as being necessary.

Many references have been cited above herein, and in addition to that which is described as background, the invention summary, brief description of the drawings, the drawings and the abstract, these references are hereby incorporated by reference into the detailed description of the preferred embodiments, as disclosing alternative embodiments of elements or features of the preferred embodiments not otherwise set forth in detail above. A single one or a combination of two or more of these references may be consulted to obtain a variation of the preferred embodiments described in the detailed description above. In addition, the following are incorporated by reference, particularly for this purpose: US2005/0041121, US2008/0043121, 2006/0204034, WO/2007/142621, U.S. Ser. No. 10/764,339, U.S. Pat. No. 7,369,712, US2005/0068452, US2006/0120599, 2006/0098237, US2006/0039690, U.S. Ser. No. 11/573,713, U.S. Ser. No. 12/042,335, US2007/0147820, US2007/0189748, US2009/0003652, and U.S. Pat. Nos. 7,336,821, 7,315,630, 7,316,631, 7,403,643, and 7,460,695, and WO/2008/017343, US2007/0269108, US2007/0296833, US2008/0292193, US2008/0175481, U.S. Ser. No. 12/042,104, U.S. Ser. No. 12/330,719, U.S. Ser. No. 11/856,721, U.S. Ser. No. 12/026,484, U.S. Ser. No. 11/861,854, U.S. Ser. No. 12/354,707, and U.S. Ser. No. 12/336,416. In addition, US published applications nos. 2003/0169818, 20030193699, 20050041123, 20060170786, and 20070025714 are incorporated by reference, particularly as disclosing alternative embodiments relating to still image cameras and/or the fourth embodiment "Dual image Acquisition Pipeline".

What is claimed is:

1. A method of combining image data from multiple frames to enhance one or more parameters of digital image quality, comprising using a processor and at least one digital image acquisition system including a lens and an image sensor in:
   acquiring a first image at a first exposure duration;
   acquiring a second image at a second exposure duration shorter than the first exposure duration and at a time just before, just after or overlapping in time with acquiring the first image, such that said first and second images comprise approximately a same first scene, and whereby the second image is relatively sharp and under-exposed and the first image is relatively well-exposed and less sharp than the second image;
   extracting brightness or color information, or both, from the first image;
   applying to the second image the brightness or color information, or both, extracted from the first image to generate an enhanced version of the second image enhanced in terms of brightness or color quality, or both;
   displaying, storing, transmitting, or streaming the enhanced version of the second image;
   acquiring a third image at or near said first exposure duration when a predetermined number of multiple frames has been recorded since the acquiring of the first image;
   acquiring a fourth image at or near said second exposure duration and at a time just before, just after or overlapping in time with the third image, such that said third and fourth images comprise approximately a same second scene different from or same as the first scene;
   extracting brightness or color, or both, from the third image;
   applying to the fourth image the brightness or color information, or both, extracted from the third image to generate an enhanced version of the fourth image enhanced in terms of brightness or color quality, or both; and
   displaying, storing, transmitting, or streaming the enhanced version of the fourth image.

2. A method of combining image data from multiple frames to enhance one or more parameters of digital image quality, comprising using a processor and at least one digital image acquisition system including a lens and an image sensor in:
   acquiring a first image at a first exposure duration;
   acquiring a second image at a second exposure duration shorter than the first exposure duration and at a time just before, just after or overlapping in time with acquiring the first image, such that said first and second images comprise approximately a same first scene, and whereby the second image is relatively sharp and under-exposed and the first image is relatively well-exposed and less sharp than the second image;
   extracting brightness or color information, or both, from the first image;
   applying to the second image the brightness or color information, or both, extracted from the first image to generate an enhanced version of the second image enhanced in terms of brightness or color quality, or both;
   displaying, storing, transmitting, or streaming the enhanced version of the second image;
   acquiring a third image at or near said first exposure duration when a predetermined amount of camera movement has been detected since the acquiring of the first image;
   acquiring a fourth image at or near said second exposure duration and at a time just before, just after or overlapping in time with the third image, such that said third and fourth images comprise approximately a same second scene different from the first scene due at least to said camera movement;
   extracting brightness or color, or both, from the third image;
   applying to the fourth image the brightness or color information, or both, extracted from the third image to generate an enhanced version of the fourth image enhanced in terms of brightness or color quality, or both; and displaying, storing, transmitting, or streaming the enhanced version of the fourth image.

3. A method of combining image data from multiple frames to enhance one or more parameters of digital image quality, comprising using a processor and at least one digital image acquisition system including a lens and an image sensor in:

acquiring a first image at a first exposure duration;

acquiring a second image at a second exposure duration shorter than the first exposure duration and at a time just before, just after or overlapping in time with acquiring the first image, such that said first and second images comprise approximately a same first scene, and whereby the second image is relatively sharp and under-exposed and the first image is relatively well-exposed and less sharp than the second image;

extracting brightness or color information, or both, from the first image;

applying to the second image the brightness or color information, or both, extracted from the first image to generate an enhanced version of the second image enhanced in terms of brightness or color quality, or both;

displaying, storing, transmitting, or streaming the enhanced version of the second image;

acquiring a third image at or near said first exposure duration including combining some of the data from the first image with some or all of the data from the second image;

acquiring a fourth image at or near said second exposure duration and at a time just before, just after or overlapping in time with the third image, such that said third and fourth images comprise approximately said same first scene;

extracting brightness or color information, or both, from the third image;

applying to the fourth image the brightness or color information, or both, extracted from the third image to generate an enhanced version of the fourth image enhanced in terms of brightness or color quality, or both; and displaying, storing, transmitting, or streaming the enhanced version of the fourth image.

4. The method of claim 3, further comprising repeatedly iterating the method as the scene evolves with time or camera movement or both.

5. The method of claim 3, further comprising:

iteratively alternating acquisition of well-exposed and sharp, under-exposed images;

extracting brightness or color information, or both, from the well-exposed images; and applying to the sharp, under-exposed images the brightness or color information, or both, extracted from the well-exposed images to generate enhanced versions of the sharp, under-exposed images enhanced in terms of brightness or color quality, or both; and displaying, storing, transmitting, or streaming the enhanced versions of the sharp, under-exposed images.

6. A method of combining image data from multiple frames to enhance one or more parameters of digital image quality, comprising using a processor and at least one digital image acquisition system including a lens and an image sensor in:

acquiring a first image at a first exposure duration;

acquiring a second image at a second exposure duration shorter than the first exposure duration and at a time just before, just after or overlapping in time with acquiring the first image, such that said first and second images comprise approximately a same first scene, and whereby the second image is relatively sharp and under-exposed and the first image is relatively well-exposed and less sharp than the second image;

extracting brightness or color information, or both, from the first image;

applying to the second image the brightness or color information, or both, extracted from the first image to generate an enhanced version of the second image enhanced in terms of brightness or color quality, or both;

displaying, storing, transmitting, or streaming the enhanced version of the second image; and wherein the method further comprising iteratively performing the following:

acquiring two sharp, under-exposed frames and a well-exposed frame;

extracting brightness or color information, or both, from the well-exposed frame;

applying to each pair of sharp, under exposed images respectively captured immediately before and immediately after the acquiring of each well-exposed frame the brightness or color information, or both, extracted from the well-exposed frame to generate enhanced versions of each of the pair of sharp, under-exposed images enhanced in terms of brightness or color quality, or both; and displaying, storing, transmitting, or streaming the enhanced versions of the pair of sharp, under-exposed images.

7. The method of any of claims 1-3 or 6, further comprising utilizing separate image acquisition subsystems (IAS's) for acquiring the first and second images.

8. The method of claim 7, wherein the separate IAS's comprise first and second IAS's, wherein the first IAS is configured to acquire images at a faster frame rate than the second IAS, such that the first IAS is specially configured to capture relatively sharp, under-exposed images and the second IAS is specially configured to capture well-exposed and less sharp images.

9. The method of claim 8, wherein the second IAS has a variable frame rate configured for capturing optimally-exposed images under different lighting conditions.

10. The method of claim 7, further comprising acquiring both the first and second images with a same lens as optical input, and splitting the optical input between first and second image sensors.

11. The method of claim 7, further comprising acquiring the first and second images, respectively, with a first lens/sensor combination and a second lens/sensor combination.

12. The method of claim 11, further comprising applying parallax correction.

13. The method of any of claims 1-3 or 6, wherein the first and second images comprise video images of a video stream.

14. A method of combining image data from multiple frames to enhance one or more parameters of digital image quality, comprising using a processor and at least one digital image acquisition system including a lens and an image sensor in:

acquiring a first image at a first exposure duration;

acquiring a second image at a second exposure duration shorter than the first exposure duration and at a time just before, just after or overlapping in time with acquiring the first image, such that said first and second images comprise approximately a same first scene, and whereby the second image is relatively sharp and under-exposed and the first image is relatively well-exposed and less sharp than the second image;

extracting brightness or color information, or both, from the first image;

applying to the second image the brightness or color information, or both, extracted from the first image to generate an enhanced version of the second image enhanced in terms of brightness or color quality, or both;

displaying, storing, transmitting, or streaming the enhanced version of the second image; and wherein the method further comprising utilizing separate image acquisition subsystems (IAS's) for acquiring the first and second images, and wherein the separate IAS's comprise first and second IAS's, wherein the first IAS is configured to acquire images at a faster frame rate than the second IAS, such that the first IAS is specially configured to capture relatively sharp, under-exposed images and the second IAS is specially configured to capture well-exposed and less sharp images, and wherein the first IAS has a fixed frame rate.

15. A digital image acquisition system, comprising a lens, an image sensor for capturing a stream of multiple digital images, a processor and a memory having processor-readable code embedded therein for programming the processor to perform a method of combining image data from multiple frames to enhance one or more parameters of digital image quality, wherein the method comprises:

acquiring a first image at a first exposure duration;

acquiring a second image at a second exposure duration shorter than the first exposure duration and at a time just before, just after or overlapping in time with acquiring the first image, such that said first and second images comprise approximately a same first scene, and whereby the second image is relatively sharp and under-exposed and the first image is well-exposed and less sharp than the second image;

extracting brightness or color information, or both, from the first image;

applying to the second image the brightness or color information, or both, extracted from the first image to generate an enhanced version of the second image enhanced in terms of brightness or color quality, or both;

acquiring a third image at or near said first exposure duration when a predetermined number of multiple frames has been recorded since the acquiring of the first image;

acquiring a fourth image at or near said second exposure duration and at a time just before, just after or overlapping in time with the third image, such that said third and fourth images comprise approximately a same second scene different from or same as the first scene;

extracting brightness or color, or both, from the third image;

applying to the fourth image the brightness or color information, or both, extracted from the third image to generate an enhanced version of the fourth image enhanced in terms of brightness or color quality, or both; and displaying, storing, transmitting, or streaming the enhanced version of the fourth image.

16. A digital image acquisition system, comprising a lens, an image sensor for capturing a stream of multiple digital images, a processor and a memory having processor-readable code embedded therein for programming the processor to perform a method of combining image data from multiple frames to enhance one or more parameters of digital image quality, wherein the method comprises:

acquiring a first image at a first exposure duration;

acquiring a second image at a second exposure duration shorter than the first exposure duration and at a time just before, just after or overlapping in time with acquiring the first image, such that said first and second images comprise approximately a same first scene, and whereby the second image is relatively sharp and under-exposed and the first image is well-exposed and less sharp than the second image;

extracting brightness or color information, or both, from the first image;

applying to the second image the brightness or color information, or both, extracted from the first image to generate an enhanced version of the second image enhanced in terms of brightness or color quality, or both;

acquiring a third image at or near said first exposure duration when a predetermined amount of camera movement has been detected since the acquiring of the first image;

acquiring a fourth image at or near said second exposure duration and at a time just before, just after or overlapping in time with the third image, such that said third and fourth images comprise approximately a same second scene different from the first scene due at least to said camera movement;

extracting brightness or color, or both, from the third image;

applying to the fourth image the brightness or color information, or both, extracted from the third image to generate an enhanced version of the fourth image enhanced in terms of brightness or color quality, or both; and displaying, storing, transmitting, or streaming the enhanced version of the fourth image.

17. A digital image acquisition system, comprising a lens, an image sensor for capturing a stream of multiple digital images, a processor and a memory having processor-readable code embedded therein for programming the processor to perform a method of combining image data from multiple frames to enhance one or more parameters of digital image quality, wherein the method comprises:

acquiring a first image at a first exposure duration;

acquiring a second image at a second exposure duration shorter than the first exposure duration and at a time just before, just after or overlapping in time with acquiring the first image, such that said first and second images comprise approximately a same first scene, and whereby the second image is relatively sharp and under-exposed and the first image is well-exposed and less sharp than the second image;

extracting brightness or color information, or both, from the first image;

applying to the second image the brightness or color information, or both, extracted from the first image to generate an enhanced version of the second image enhanced in terms of brightness or color quality, or both;

acquiring a third image at or near said first exposure duration including combining some of the data from the first image with some or all of the data from the second image;

acquiring a fourth image at or near said second exposure duration and at a time just before, just after or overlapping in time with the third image, such that said third and fourth images comprise approximately said same first scene;

extracting brightness or color information, or both, from the third image;

applying to the fourth image the brightness or color information, or both, extracted from the third image to generate an enhanced version of the fourth image enhanced in terms of brightness or color quality, or both; and displaying, storing, transmitting, or streaming the enhanced version of the fourth image.

18. The system of claim 17, wherein the method further comprises repeatedly iterating the method as the scene evolves with time or camera movement or both.

19. The system of claim 17, wherein the method further comprises:
iteratively alternating acquisition of well-exposed and sharp, under-exposed images;
extracting brightness or color information, or both, from the well-exposed images; and
applying to the sharp, under-exposed images the brightness or color information, or both, extracted from the well-exposed images to generate enhanced versions of the sharp, under-exposed images enhanced in terms of brightness or color quality, or both; and
displaying, storing, transmitting, or streaming the enhanced versions of the sharp, under-exposed images.

20. A digital image acquisition system, comprising a lens, an image sensor for capturing a stream of multiple digital images, a processor and a memory having processor-readable code embedded therein for programming the processor to perform a method of combining image data from multiple frames to enhance one or more parameters of digital image quality, wherein the method comprises:
acquiring a first image at a first exposure duration;
acquiring a second image at a second exposure duration shorter than the first exposure duration and at a time just before, just after or overlapping in time with acquiring the first image, such that said first and second images comprise approximately a same first scene, and whereby the second image is relatively sharp and under-exposed and the first image is well-exposed and less sharp than the second image;
extracting brightness or color information, or both, from the first image;
applying to the second image the brightness or color information, or both, extracted from the first image to generate an enhanced version of the second image enhanced in terms of brightness or color quality, or both, and
wherein the method further comprises iteratively performing the following:
acquiring two sharp, under-exposed frames and a well-exposed frame;
extracting brightness or color information, or both, from the well-exposed frame;
applying to each pair of sharp, under exposed images respectively captured immediately before and immediately after the acquiring of each well-exposed frame the brightness or color information, or both, extracted from the well-exposed frame to generate enhanced versions of each of the pair of sharp, under-exposed images enhanced in terms of brightness or color quality, or both; and
displaying, storing, transmitting, or streaming the enhanced versions of the pair of sharp, under-exposed images.

21. The system of any of claims 15-17 or 20, wherein the method further comprises separate image acquisition subsystems (IAS's) for acquiring the first and second images.

22. The system of claim 21, wherein the separate IAS's comprise first and second IAS's, wherein the first IAS is configured to acquire images at a faster frame rate than the second IAS, such that the first IAS is specially configured to capture relatively sharp, under-exposed images and the second IAS is specially configured to capture well-exposed and less sharp images.

23. The system of claim 22, wherein the first IAS has a fixed frame rate.

24. The system of claim 22, wherein the second IAS has a variable frame rate configured for capturing optimally-exposed images under different lighting conditions.

25. The system of claim 21, wherein the method further comprises acquiring both the first and second images with a same lens as optical input, and splitting the optical input between first and second image sensors.

26. The system of claim 21, wherein the method further comprises acquiring the first and second images, respectively, with a first lens/sensor combination and a second lens/sensor combination.

27. The system of claim 26, wherein the method further comprises applying parallax correction.

28. The system of any of claims 15-17 or 20, wherein the first and second images comprise video images of a video stream.

29. One or more non-transitory processor-readable media having processor-readable code embedded therein for programming one or more processors to perform a method of combining image data from multiple frames to enhance one or more parameters of digital image quality, comprising:
acquiring a first image at a first exposure duration;
acquiring a second image at a second exposure duration shorter than the first exposure duration and at a time just before, just after or overlapping in time with acquiring the first image, such that said first and second images comprise approximately a same first scene, and whereby the second image is relatively sharp and under-exposed and the first image is well-exposed and less sharp than the second image;
extracting brightness or color information, or both, from the first image;
applying to the second image the brightness or color information, or both, extracted from the first image to generate an enhanced version of the second image enhanced in terms of brightness or color quality, or both;
acquiring a third image at or near said first exposure duration when a predetermined number of multiple frames has been recorded since the acquiring of the first image;
acquiring a fourth image at or near said second exposure duration and at a time just before, just after or overlapping in time with the third image, such that said third and fourth images comprise approximately a same second scene different from or same as the first scene;
extracting brightness or color, or both, from the third image;
applying to the fourth image the brightness or color information, or both, extracted from the third image to generate an enhanced version of the fourth image enhanced in terms of brightness or color quality, or both; and
displaying, storing, transmitting, or streaming the enhanced version of the fourth image.

30. One or more non-transitory processor-readable media having processor-readable code embedded therein for programming one or more processors to perform a method of combining image data from multiple frames to enhance one or more parameters of digital image quality, comprising:
acquiring a first image at a first exposure duration;
acquiring a second image at a second exposure duration shorter than the first exposure duration and at a time just before, just after or overlapping in time with acquiring the first image, such that said first and second images comprise approximately a same first scene, and whereby the second image is relatively sharp and under-exposed and the first image is well-exposed and less sharp than the second image;

extracting brightness or color information, or both, from the first image;

applying to the second image the brightness or color information, or both, extracted from the first image to generate an enhanced version of the second image enhanced in terms of brightness or color quality, or both;

acquiring a third image at or near said first exposure duration when a predetermined amount of camera movement has been detected since the acquiring of the first image;

acquiring a fourth image at or near said second exposure duration and at a time just before, just after or overlapping in time with the third image, such that said third and fourth images comprise approximately a same second scene different from the first scene due at least to said camera movement;

extracting brightness or color, or both, from the third image;

applying to the fourth image the brightness or color information, or both, extracted from the third image to generate an enhanced version of the fourth image enhanced in terms of brightness or color quality, or both; and displaying, storing, transmitting, or streaming the enhanced version of the fourth image.

31. One or more non-transitory processor-readable media having processor-readable code embedded therein for programming one or more processors to perform a method of combining image data from multiple frames to enhance one or more parameters of digital image quality, comprising:

acquiring a first image at a first exposure duration;

acquiring a second image at a second exposure duration shorter than the first exposure duration and at a time just before, just after or overlapping in time with acquiring the first image, such that said first and second images comprise approximately a same first scene, and whereby the second image is relatively sharp and under-exposed and the first image is well-exposed and less sharp than the second image;

extracting brightness or color information, or both, from the first image;

applying to the second image the brightness or color information, or both, extracted from the first image to generate an enhanced version of the second image enhanced in terms of brightness or color quality, or both;

acquiring a third image at or near said first exposure duration including combining some of the data from the first image with some or all of the data from the second image;

acquiring a fourth image at or near said second exposure duration and at a time just before, just after or overlapping in time with the third image, such that said third and fourth images comprise approximately said same first scene;

extracting brightness or color information, or both, from the third image;

applying to the fourth image the brightness or color information, or both, extracted from the third image to generate an enhanced version of the fourth image enhanced in terms of brightness or color quality, or both; and displaying, storing, transmitting, or streaming the enhanced version of the fourth image.

32. The one or more processor-readable media of claim 31, wherein the method further comprises repeatedly iterating the method as the scene evolves with time or camera movement or both.

33. The one or more processor-readable media of claim 31, wherein the method further comprises:

iteratively alternating acquisition of well-exposed and sharp, under-exposed images;

extracting brightness or color information, or both, from the well-exposed images; and applying to the sharp, under-exposed images the brightness or color information, or both, extracted from the well-exposed images to generate enhanced versions of the sharp, under-exposed images enhanced in terms of brightness or color quality, or both; and displaying, storing, transmitting, or streaming the enhanced versions of the sharp, under-exposed images.

34. One or more non-transitory processor-readable media having processor-readable code embedded therein for programming one or more processors to perform a method of combining image data from multiple frames to enhance one or more parameters of digital image quality, comprising:

acquiring a first image at a first exposure duration;

acquiring a second image at a second exposure duration shorter than the first exposure duration and at a time just before, just after or overlapping in time with acquiring the first image, such that said first and second images comprise approximately a same first scene, and whereby the second image is relatively sharp and under-exposed and the first image is well-exposed and less sharp than the second image;

extracting brightness or color information, or both, from the first image;

applying to the second image the brightness or color information, or both, extracted from the first image to generate an enhanced version of the second image enhanced in terms of brightness or color quality, or both; and wherein the method further comprises iteratively performing the following:

acquiring two sharp, under-exposed frames and a well-exposed frame;

extracting brightness or color information, or both, from the well-exposed frame;

applying to each pair of sharp, under exposed images respectively captured immediately before and immediately after the acquiring of each well-exposed frame the brightness or color information, or both, extracted from the well-exposed frame to generate enhanced versions of each of the pair of sharp, under-exposed images enhanced in terms of brightness or color quality, or both; and displaying, storing, transmitting, or streaming the enhanced versions of the pair of sharp, under-exposed images.

35. The one or more processor-readable media of any of claims 29-31 or 34, wherein the method further comprises utilizing separate image acquisition subsystems (IAS's) for acquiring the first and second images.

36. The one or more processor-readable media of claim 35, wherein the separate IAS's comprise first and second IAS's, wherein the first IAS is configured to acquire images at a faster frame rate than the second IAS, such that the first IAS is specially configured to capture relatively sharp, under-exposed images and the second IAS is specially configured to capture well-exposed and less sharp images.

37. The one or more processor-readable media of claim 36, wherein the first IAS has a fixed frame rate.

38. The one or more processor-readable media of claim 36, wherein the second IAS has a variable frame rate configured for capturing optimally-exposed images under different lighting conditions.

39. The one or more processor-readable media of claim 35, wherein the method further comprises acquiring both the first and second images with a same lens as optical input, and splitting the optical input between first and second image sensors.

40. The one or more processor-readable media of claim 35, wherein the method further comprises acquiring the first and second images, respectively, with a first lens/sensor combination and a second lens/sensor combination.

41. The one or more processor-readable media of claim 40, wherein the method further comprises applying parallax correction.

42. The one or more processor-readable media of any of claims 29-31 or 34, wherein the first and second images comprise video images of a video stream.

* * * * *